(12) United States Patent
Schillaci

(10) Patent No.: US 7,463,443 B2
(45) Date of Patent: Dec. 9, 2008

(54) REDUCED HARDWARE CONTROL CIRCUIT DEVICE, WITH CURRENT LOOP FOR BROAD BAND HARD DISK DRIVE APPLICATIONS

(75) Inventor: Luca Schillaci, Belgioioso (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 338 days.

(21) Appl. No.: 11/225,394

(22) Filed: Sep. 13, 2005

(65) Prior Publication Data

US 2007/0170878 A1  Jul. 26, 2007

(30) Foreign Application Priority Data

Sep. 27, 2004  (EP) .................. 04425719

(51) Int. Cl.
G11B 21/02 (2006.01)
(52) U.S. Cl. .............. 360/75; 360/67; 360/78.04; 318/34; 318/254
(58) Field of Classification Search .......... 318/254, 318/34, 561; 330/146; 327/561; 360/67, 360/75, 78.09; 369/43, 44.35
See application file for complete search history.

(56) References Cited

U.S. PATENT DOCUMENTS

| | | | | |
|---|---|---|---|---|
| 4,786,993 A | * | 11/1988 | Jove et al. ............... 360/67 |
| 4,885,517 A | * | 12/1989 | Pennock ................... 318/678 |
| 5,191,297 A | * | 3/1993 | Penman et al. ........... 330/146 |
| 5,412,309 A | * | 5/1995 | Ueunten .................... 323/316 |
| 5,426,545 A | * | 6/1995 | Sidman et al. ........... 360/78.09 |
| 5,463,603 A | * | 10/1995 | Petersen ..................... 360/67 |
| 5,530,399 A | * | 6/1996 | Chambers et al. ......... 327/561 |
| 5,648,738 A | * | 7/1997 | Welland et al. ............ 327/307 |
| 5,789,973 A | * | 8/1998 | Barrett et al. .............. 327/561 |
| 5,859,518 A | * | 1/1999 | Vitunic ...................... 318/701 |
| 6,023,143 A | * | 2/2000 | Salina et al. ............... 318/599 |
| 6,072,339 A | | 6/2000 | Bertolini |
| 6,084,378 A | * | 7/2000 | Carobolante ............... 318/811 |
| 6,154,340 A | * | 11/2000 | Cameron .................... 360/75 |
| 6,420,910 B1 | * | 7/2002 | Contreras et al. .......... 327/77 |
| 6,445,530 B1 | * | 9/2002 | Baker ....................... 360/78.04 |
| 6,479,954 B1 | | 11/2002 | Peritore et al. |

(Continued)

FOREIGN PATENT DOCUMENTS

EP  0 915 346  5/1999

(Continued)

OTHER PUBLICATIONS

European Search Report, EO 04 425719, dated May 13, 2005.

Primary Examiner—Walter Benson
Assistant Examiner—Antony M Paul
(74) Attorney, Agent, or Firm—Gardere Wynne Sewell LLP

(57) ABSTRACT

A reduced hardware control circuit device includes a current loop for broad band Hard Disk Drive applications. The current loop detects the value of the current flowing on the coils of a voice coil electric motor incorporated in the Hard Disk Drive. A sensing resistance is connected in series with the motor and at least a driving driver for a relative motor coil. Advantageously the current loop is a transconductance loop with a first transconductance amplifier associated with the sensing resistance. A second transconductance amplifier is provided for fixing the current value to be applied to the motor. The circuit device advantageously is deprived of a local compensation in correspondence with the first transconductance amplifier.

14 Claims, 4 Drawing Sheets

U.S. PATENT DOCUMENTS

| | | | |
|---|---|---|---|
| 6,850,378 B2 * | 2/2005 | Conteras et al. | 360/46 |
| 6,965,488 B1 * | 11/2005 | Bennett | 360/75 |
| 7,250,746 B2 * | 7/2007 | Oswald et al. | 323/284 |
| 7,327,103 B1 * | 2/2008 | El-Sadi | 318/34 |
| 7,339,760 B2 * | 3/2008 | Gleason et al. | 360/67 |
| 2002/0001153 A1 * | 1/2002 | Maiocchi | 360/73.03 |
| 2003/0102851 A1 * | 6/2003 | Stanescu et al. | 323/280 |
| 2003/0210091 A1 * | 11/2003 | Kuo | 330/9 |

FOREIGN PATENT DOCUMENTS

EP          1 339 163          8/2003

\* cited by examiner

REDUCED HARDWARE CONTROL CIRCUIT DEVICE, WITH CURRENT LOOP FOR BROAD BAND HARD DISK DRIVE APPLICATIONS

PRIORITY CLAIM

The present application claims priority from European Patent Application No. 04425719.4 filed Sep. 27, 2004, the disclosure of which is hereby incorporated by reference.

BACKGROUND OF THE INVENTION

1. Technical Field of the Invention

The present invention relates to a reduced hardware control circuit device with current loop for broad band Hard Disk Drive applications. More particularly, the invention relates to a device of the above type and comprising a current loop for detecting the current value which flows on the coils of a voice coil electric motor incorporated in said Hard Disk Drive and including a sensing resistance, connected in series with the motor and at least a driving driver for a relative coil of the motor.

2. Description of Related Art

As it is well known in this specific technical field, in the Hard Disc Drives at least a magnetic disk is provided which serves as storing support and a data reading and writing head which is supported at the end of an actuator arm.

This arm controls the position of the head by means of a small electric motor of the voice coil motor (VCM) type, which typically includes a coil associated with the actuator arm, and also one or more permanent magnets which produce a magnetic flux wherein the coil is immersed.

The application of a controlled current on the coil causes an interaction between the permanent magnets and the coil itself so as to drive the motor according to well known Lorentz relations.

The motor rotation allows to activate the actuator arm which, by means of a kinematic coupling, drives the head or heads above the surface of the disk.

With reference to FIG. 1, a classical control circuit device with current loop for a motor M of the voice coil type and for Hard disk drive applications is shown.

A person skilled in this art will appreciate the presence, in the current loop, of two drivers which drive the motor M coils, respectively with gain +Ap and −Ap, a sense amplifier Gs which fixes the current in the sensing resistance Rs, an error amplifier and an input buffer stage receiving a control signal from a digital/analog converter (DAC).

The aim of the control device is fundamentally that of detecting the value of the current which flows in the motor to feedback drive the coils of the motor itself according to the shifting need of the reading head arm.

In the scheme of FIG. 1 the resistances Ri and Rf which fix the loop gain and which, generally, for a good matching are external to the current loop, complete the loop. Also an external network Rc, Cc is provided which compensates the loop deleting the pole introduced by the motor.

In a current loop of this type the transfer function is fixed by the ratio Rf/Ri and by the values of Rs and Gs.

Making reference to the acronyms of the components shown in FIG. 1 what follows is obtained:

$$I=(-Rf/Ri)*(Vin/Rs\ Gs)*(1/(1+s\ Rf(Rm+Rs)Cc/(2Rs\ Gs\ Ap))$$

FIG. 2 schematically shows how the loop band in this configuration depends, at a rough estimate, on the external components Cc, Rs and Rf and on the amplifiers Gs and Ap gains, besides on the motor resistance.

In particular a loop gain is given by the following relation:

$$Gloop=(-1/(s\ Cc\ Rf))*(2Ap\ Gs\ Rs)/(Rs+Rm)$$

With a corresponding passing band given by:

$$\omega t=(1/(Cc\ Rf))*(2Ap\ Gs\ Rs)/(Rs+Rm)$$

FIG. 3 shows the scheme of the implementation which is currently commercialized.

In this case the sense amplifier has been implemented with a stage Gm/Gm and with a local reaction which fixes the gain thereof for improving its reaction in the common input way. This solution is described in U.S. Pat. No. 6,072,339, to the same Applicant, the disclosure of which is hereby incorporated by reference.

Although advantageous under several points of view, this solution has some limitations since the system band is limited by the poles of the output stage, but also by those of the sense amplifier and by the error amplifier band, since they are all locally reactioned systems. Therefore, although changing the values of the capacitive and resistive components Cc and Rf external to the current loop, even in a suitable way, the system band, before or after, happens to approach these poles and thus to worsen the step margin.

There is accordingly a need in the art for devising a control circuit device for broad band Hard Disk Drive applications having such structural and functional characteristics as to improve the performances of the current loop typically used for driving the voice coil motor with the employment of a reduced number of circuit blocks in the control portion and a corresponding reduction of circuit area.

There is also a need in the art to increase the total band of the current loop eliminating possible local loops which limit the broad band performance.

SUMMARY OF THE INVENTION

In accordance with the present invention, a current loop with transconductance but without a local compensation is provided which limits the band width and which closes the current loop immediately downstream of a first transconductance amplifier associated with the sensing resistance.

In accordance with an embodiment of the present invention, a control circuit device with current loop for broad band Hard Disk Drive applications comprises a current loop for detecting the value of a current flowing through coils of a voice coil electric motor incorporated in said Hard Disk Drive and including a sensing resistance connected in series with the motor. A driving driver is provided for a relative motor coil. The current loop is a transconductance loop with a transconductance amplifier associated with said sensing resistance.

In another embodiment, a voice coil motor circuit comprises a current sensing resistor connected in series with the voice coil motor and a driver circuit connected in series with the voice coil motor. An output amplifier is coupled at its output to the driver circuit and further including a first input. A first transconductance amplifier has inputs coupled across the current sensing resistor and an output coupled to the first input of the output amplifier.

In another embodiment, a voice coil motor circuit comprises a current sensing resistor connected in series with the voice coil motor and a driver circuit connected in series with the voice coil motor. An output amplifier is coupled at its output to the driver circuit and further including a first input.

A current loop with transconductance but without a local compensation is coupled to the first input wherein the current loop closes immediately downstream of a first transconductance amplifier associated with the current sensing resistor.

In yet another embodiment, a voice coil motor circuit comprises a current sensing resistor connected in series with the voice coil motor and a driver circuit connected in series with the voice coil motor. An output amplifier is coupled at its output to the driver circuit and further including a first input. A feedback circuit is coupled between the current sensing resistor and the first input of the output amplifier wherein the feedback circuit consists of a first transconductance amplifier having inputs coupled across the current sensing resistor and an output coupled to the first input of the output amplifier.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 4:
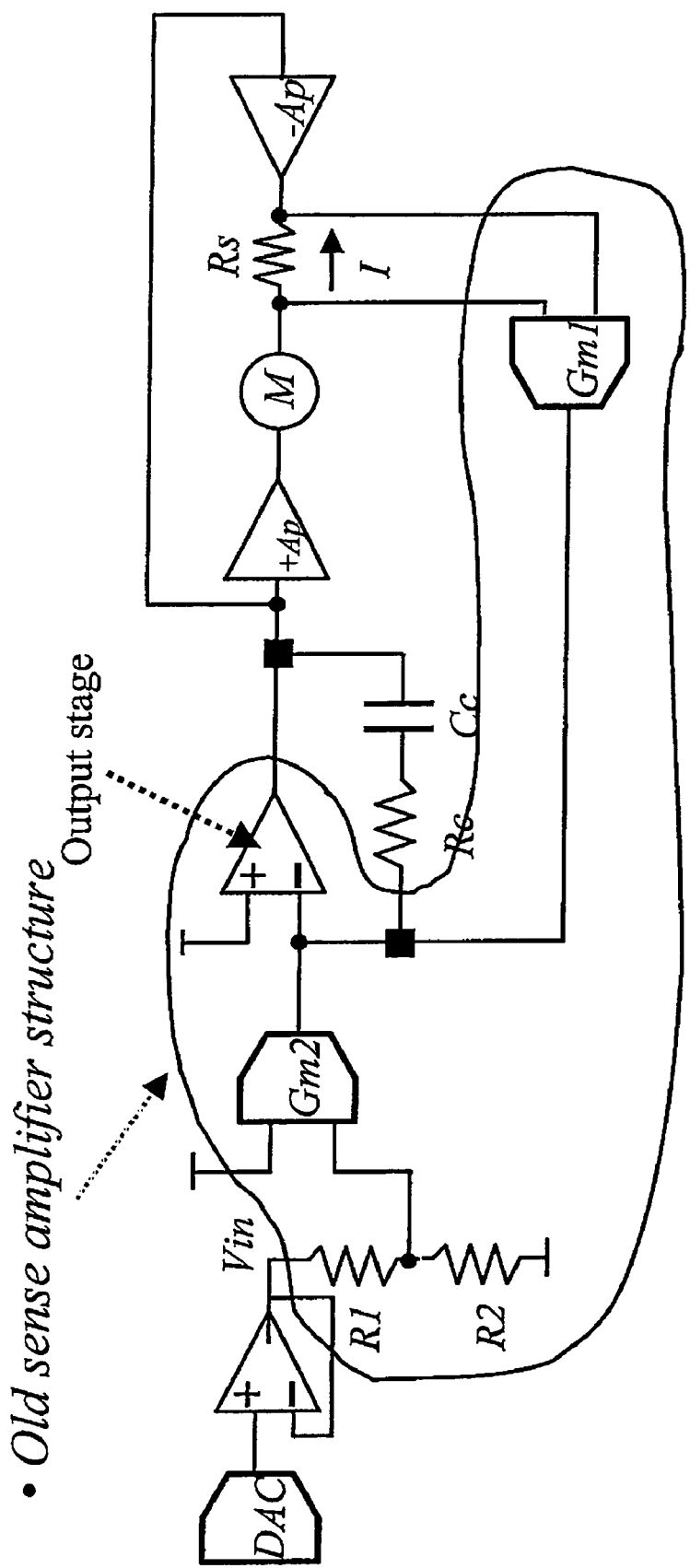
FIG. 4 shows a schematic view of a circuit device realized according to an embodiment of the present invention with reduced hardware and with a transconductance loop for broad band Hard Disk Drive applications.

With reference to these FIGURES, and in particular to the example of FIG. 4, there is shown a circuit device realized according to an embodiment of the present invention with reduced hardware and with a transconductance loop for broad band Hard Disk Drive applications.

Figure 1:
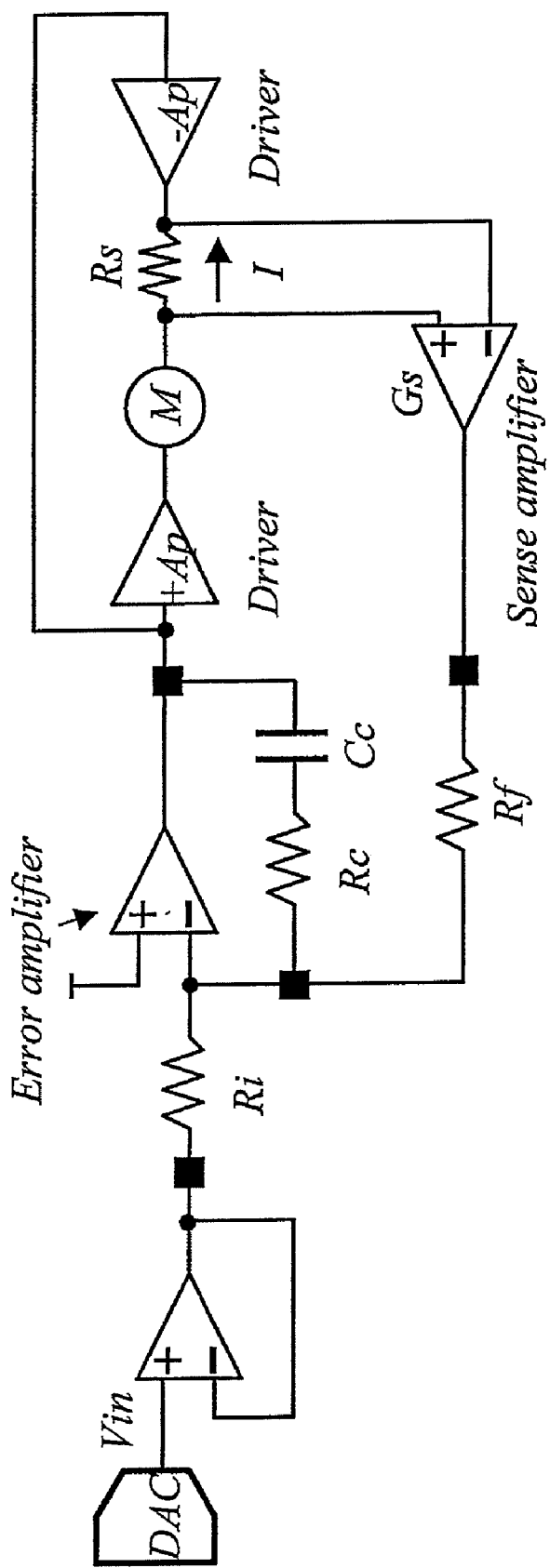
FIG. 1 shows a schematic view of a current loop circuit device realized according to the prior art for driving a voice coil motor of a Hard Disk Drive.
Figure 2:
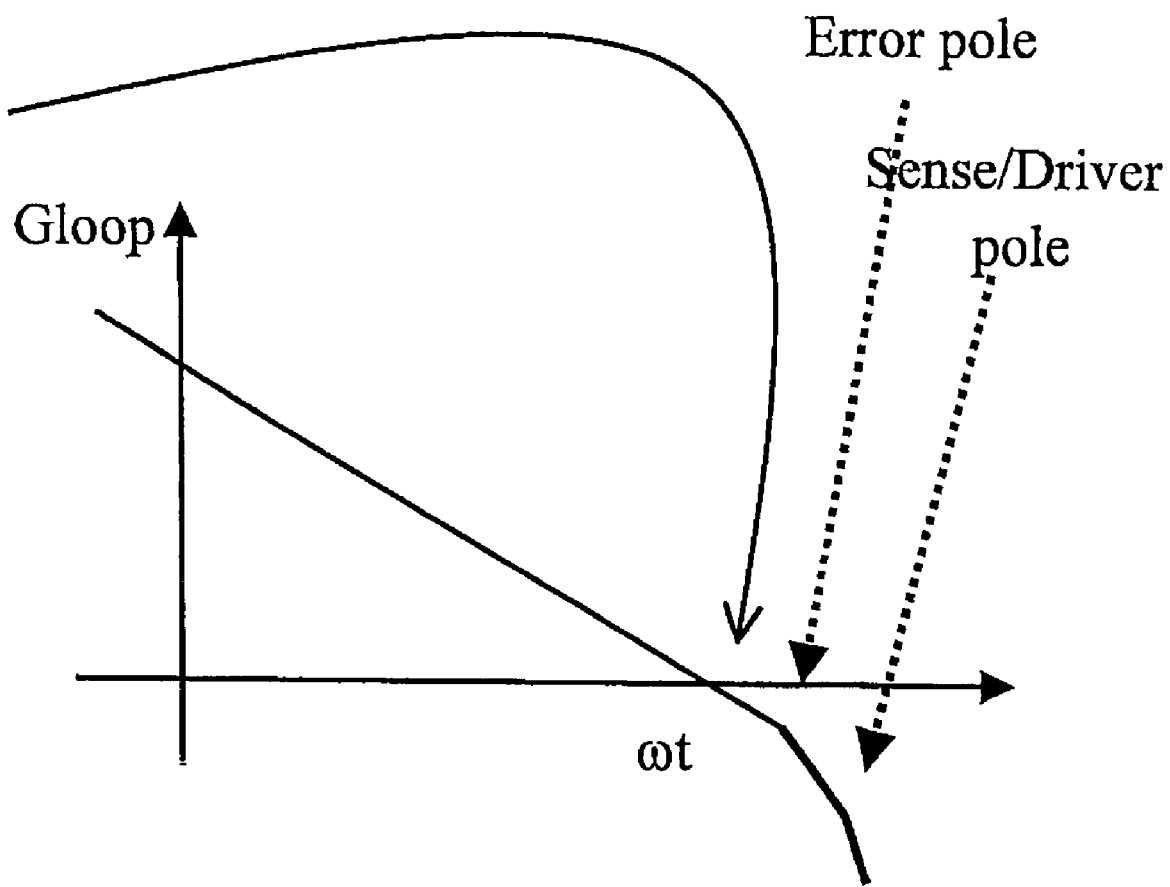
FIG. 2 shows a schematic view of a diagram loop gain/rotation speed of the motor which shows the dependence of the gain on values of components external to the current loop.
Figure 3:
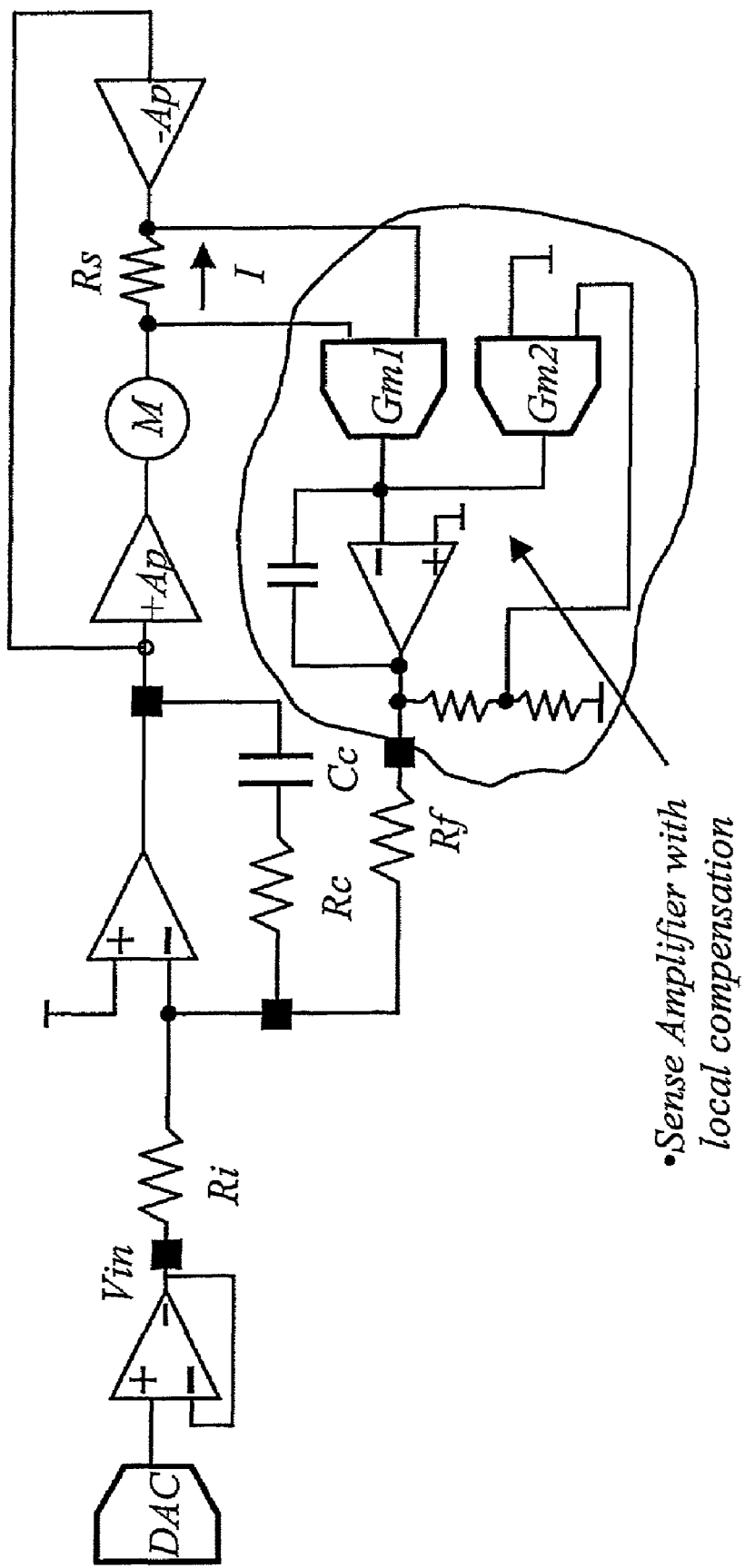
FIG. 3 shows a schematic view of a circuit device realized always according to the prior art for broad band Hard Disk Drive applications.

This example of FIG. 4 will be now described by making reference to differences with respect to the known solution of FIG. 3. As a consequence, details and cooperating parts of this circuit having the same structure and operation as those indicated in FIG. 3 will be shown with the same reference acronyms.

Advantageously, in this solution the sense amplifier Gs is actually substituted by a structure devoid of local compensation. In other words, "non-locally compensated" in this context means that the current loop is closed without a local feedback.

The solution of the present invention provides a transconductance loop comprising a first Gm1 and a second Gm2 transconductance amplifier.

The first transconductance amplifier Gm1 detects the current value which flows through the sensing resistance Rs in series with the motor M.

The second transconductance amplifier Gm2 receives as input the signal from the input buffer stage and a reference value, and generates an output which is input to the output stage which drives the drivers Ap associated with the motor.

Between the input buffer stage of the device and an input of the second transconductance amplifier a resistive divider is provided comprising a pair of resistances R1 and R2, non indispensable to the purposes of the invention. The other input of the transconductance amplifier Gm2 is maintained at a reference voltage potential.

Between the output of the second transconductance amplifier Gm2 and the motor drivers a driving output stage is introduced to which is further input the output of the first transconductance amplifier Gm1.

The second transconductance amplifier Gm2 outputs a piece of information on the current value which is to be applied to the motor M, i.e. the current which is to flow in the above resistance Rs, and thus also in the motor coils.

The value output by the second transconductance amplifier is given by:

$$Is=(Vin*R2/(R1+R2)*Gm2)$$

and it must necessarily be equal and contrary to that detected by the other transconductance amplifier Gm1.

In practice the current equality which it previously tried to obtain from a transfer function of the system given by the ratio between the resistances Rf and Ri, is more precisely obtained according to the present invention from the two transconductance amplifiers Gm1 and Gm2.

In this way there is the sensible difference that the local loop of the sense amplifier is eliminated and thus its phase contribution in the main current loop is no longer present.

The loop gain is now fixed by the ratio of the two transconductances Gm and by the ratio of the two resistances R1 and R2.

It is also to be noted that the two resistances R1 and R2 are not strictly necessary, if not for optimizing the dynamics.

In fact also the external resistive and/or capacitive components used in the loop of FIG. 3, along with their associated pads on the integrated circuit, are eliminated, but, mainly, the band of the sense amplifier is removed from the current loop.

It is to be noted how, further, the new error amplifier must not be necessarily an operational amplifier, but it could simply be the output stage of the double differential input Gm1 and Gm2.

It is thus worth noting that the compensation of the previous error amplifier in fact disappears from the current loop since now it coincides with that of the sole external capacitive and resistive components Cc and Rc and thus also this frequency limitation is eliminated.

As it can be appreciated, the transfer function of the circuit device according to the invention can be taken from the following relation:

$$I=(-R2/(R1+R2))*(Gm2/(Rs\ Gm1))*(Vin/(1+s(Rs+Rm)Cc/(2Ap\ Rs\ Gm1))$$

Assuming that the transconductance values of the two transconductance amplifiers are the same, i.e. that:

$$Gm1=Gm2$$

then a simplification of the previous relation is obtained becoming:

$$I=(-R2/(R1+R2))*(1/Rs)*(Vin/(1+s(Rs+Rm)Cc/2ApRsGm1)$$

The corresponding passing band is thus given by:

$$\omega t=(Gm1/Cc)*(2Ap\ Rs)/(Rs+Rm)$$

From the previous description it can be appreciated how the invention address the need in the art and attains several advantages among which it is worth noting the fact that, with respect to the known solutions, the invention provides the closure of the current loop already after the output of the first transconductance amplifier.

From the expression of the new band it can be seen how the term Gm1 substitutes the ratio Gs/Rf, whereas the second transconductance amplifier, together with the two resistances R1 and R2, if present, only fixes the gain with closed loop of the stage.

Moreover, the poles of the sense amplifier have been cut with respect to the solutions proposed by the known technique.

It is still to be noted how it is even possible to eliminate the error amplifier from the current loop of the present solution, by using now the same output stage as that of the previous sensing amplifier shown in FIG. 3.

Moreover, resistive components have been eliminated such as the resistances Rf and Ri and only two input pads are necessary for the connection of Rc and Cc.

Although preferred embodiments of the device of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A control circuit device with current loop for broad band Hard Disk Drive applications, comprising:
a current loop for detecting the value of a current flowing through coils of a voice coil electric motor incorporated in said Hard Disk Drive and including a sensing resistance connected in series with the motor;
a driver for a relative motor coil;
an error amplifier having an output connected to the driver;
wherein said current loop includes a feedback transconductance portion including a first transconductance amplifier associated with said sensing resistance, an output from the first transconductance amplifier being directly connected to an input of the error amplifier; and
a second transconductance amplifier for fixing the current value to be applied to the motor, the second transconductance amplifier having an output directly connected to the input of the error amplifier and having an input which is not in the current loop for receiving a motor control voltage.

2. The circuit device according to claim 1, further comprising a resistive divider upstream of the input to the second transconductance amplifier comprising at least a pair of resistances which generate the motor control voltage.

3. The circuit device according to claim 2, wherein the loop gain of the device is fixed by a ratio of transconductances for the first and second transconductance amplifiers and by a ratio of said two resistances.

4. The circuit device according to claim 1, wherein transconductance values of said first and second transconductance amplifiers are equal to each other.

5. A voice coil motor circuit, comprising:
a current sensing resistor connected in series with the voice coil motor;
a driver circuit connected in series with the voice coil motor;
an output amplifier coupled at its output to the driver circuit and further including a first input;
a first transconductance amplifier having first and second voltage inputs coupled to sense voltages at terminals of the current sensing resistor and a current output generating a first current signal which is directly applied to the first input of the output amplifier; and
a second transconductance amplifier having a current output generating a second current signal which is applied to the first input of the output amplifier along with the first current signal.

6. The circuit of claim 5 wherein the driver circuit comprises a first driver and a second driver oppositely coupled in series with the current sensing resistor and voice coil motor.

7. The circuit of claim 5 further comprising an RC circuit connected between the first input of the output amplifier and the output of the output amplifier.

8. The circuit of claim 5 further including a voltage divider circuit having an output coupled to a first input of the second transconductance amplifier.

9. The circuit of claim 8 wherein a second input of the second transconductance amplifier is coupled to a first reference voltage.

10. The circuit of claim 9 wherein a second input of the output amplifier is coupled to a second reference voltage.

11. A voice coil motor circuit, comprising:
a current sensing resistor connected in series with the voice coil motor;
a driver circuit connected in series with the voice coil motor;
an output amplifier coupled at its output to the driver circuit and further including a first input;
a feedback loop coupled between the first input of the output amplifier and the current sensing resistor, wherein the feedback loop comprises a first transconductance amplifier having first and second inputs coupled to ends of the current sensing resistor; and
a second transconductance amplifier having an output connected to the first input of the output amplifier with the feedback loop, a first input receiving a motor drive voltage and a second input receiving a reference voltage.

12. The circuit of claim 11 wherein the motor drive voltage received at the first input of the second transconductance amplifier is not generated in the feedback loop.

13. A voice coil motor circuit, comprising:
a current sensing resistor connected in series with the voice coil motor;
a driver circuit connected in series with the voice coil motor;
an output amplifier coupled at its output to the driver circuit and further including a first input;
a feedback circuit coupled between the current sensing resistor and the first input of the output amplifier wherein the feedback circuit consists of a first transconductance amplifier having first and second inputs coupled to ends of the current sensing resistor and an output coupled to the first input of the output amplifier; and
a second transconductance amplifier having an output directly connected to the first input of the output amplifier and an input receiving a motor drive voltage.

14. The circuit of claim 13 wherein the motor drive voltage received at the input to the second transconductance amplifier is not generated in the feedback circuit.

* * * * *